United States Patent
Tsujita et al.

(10) Patent No.: US 9,738,810 B2
(45) Date of Patent: Aug. 22, 2017

(54) COATING MATERIAL COMPOSITION, AND COATED FILMS OBTAINED BY THE COATING THEREOF

(71) Applicant: Akzo Nobel Coatings International B.V., Arnhem (NL)

(72) Inventors: Takahiro Tsujita, Kanagawa (JP); Shinji Yagi, Hyogo (JP); Nobuhiro Nishida, Yokohama (JP); Yoshitomo Takeuchi, Yokohama (JP)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 14/897,876

(22) PCT Filed: Apr. 25, 2014

(86) PCT No.: PCT/EP2014/058481
§ 371 (c)(1),
(2) Date: Dec. 11, 2015

(87) PCT Pub. No.: WO2014/198452
PCT Pub. Date: Dec. 18, 2014

(65) Prior Publication Data
US 2016/0145461 A1    May 26, 2016

(30) Foreign Application Priority Data

Jun. 13, 2013 (JP) ................... 2013-124787

(51) Int. Cl.
| | |
|---|---|
| C09D 163/00 | (2006.01) |
| C09D 7/12 | (2006.01) |
| C08G 18/58 | (2006.01) |
| C08G 18/62 | (2006.01) |
| C08G 18/64 | (2006.01) |
| C08G 18/80 | (2006.01) |
| C08G 18/32 | (2006.01) |
| C08G 18/42 | (2006.01) |
| C08G 59/40 | (2006.01) |
| C09D 5/00 | (2006.01) |

(52) U.S. Cl.
CPC ....... C09D 163/00 (2013.01); C08G 18/3206 (2013.01); C08G 18/4277 (2013.01); C08G 18/58 (2013.01); C08G 18/6212 (2013.01); C08G 18/6407 (2013.01); C08G 18/80 (2013.01); C08G 59/4028 (2013.01); C09D 5/00 (2013.01); C09D 7/125 (2013.01); C09D 7/1283 (2013.01); C09D 7/1291 (2013.01)

(58) Field of Classification Search
CPC ..................................................... C09D 163/00
See application file for complete search history.

(56) References Cited

U.S. PATENT DOCUMENTS

| | | | |
|---|---|---|---|
| 2006/0030651 A1 | 2/2006 | Kubish et al. | |
| 2007/0295943 A1* | 12/2007 | Jun | H01B 1/22 252/512 |
| 2008/0078977 A1* | 4/2008 | Hashiba | C08J 3/12 252/500 |
| 2008/0124552 A1* | 5/2008 | Hashiba | C23C 18/1635 428/407 |
| 2011/0088935 A1* | 4/2011 | Ishimatsu | H05K 3/323 174/257 |

FOREIGN PATENT DOCUMENTS

| | | |
|---|---|---|
| FR | 2874018 A1 | 2/2006 |
| JP | 2006219731 A | 8/2006 |
| JP | 2009197067 A | 9/2009 |
| JP | 4448511 B2 | 4/2010 |
| WO | WO-2012/160894 A1 | 11/2012 |

OTHER PUBLICATIONS

English machine translation of JP 2009/197067. Original Japanese document published Sep. 3, 2009. Translation done Mar. 16, 2017.*
International Search Report for International Patent Application No. PCT/EP2014/058481, dated Aug. 7, 2014.

* cited by examiner

*Primary Examiner* — Megan McCulley
(74) *Attorney, Agent, or Firm* — McDonnell Boehnen Hulbert & Berghoff LLP

(57) ABSTRACT

A coating material composition for providing coated films is disclosed. The coating material composition contains coated film forming resin (A), crosslinking agent (B), and resin beads (C), in which compression strength of the resin beads (C) at the time of the 10% pressurized deformation of an individual resin bead by means of a micro-compression tester lies between 0.1 MPa and 20 MPa and a recovery of the resin beads (C) following 90% pressurized deformation of an individual resin bead by means of a micro-compression tester is at least 80%.

7 Claims, No Drawings

COATING MATERIAL COMPOSITION, AND COATED FILMS OBTAINED BY THE COATING THEREOF

CROSS-REFERENCE TO RELATED APPLICATIONS

This is the U.S. national phase of International Application No. PCT/EP2014/058481, filed Apr. 25, 2014, which claims the benefit of Japanese Patent application No. 2013-124787, filed Jun. 13, 2013.

TECHNICAL FIELD

The present invention relates to a coating material composition which is outstanding, in particular, in its pressure mark resistance as a backcoat (underside) coating material in the production of precoated steel sheet.

BACKGROUND ART

In contrast to post-coating where the coating is carried out after first fabricating in the form of the target manufactured product, precoated steel sheet is metal sheet (cut sheet or coil) which is subjected to coating beforehand prior to the fabrication thereof, and it is widely employed for building materials such as roofs and walls, and for the housings of audio equipment, refrigerators, partitions, and the like, in that there are advantages in terms of cost, energy savings, and materials savings when compared to post-coating.

The coating of precoated steel sheet is generally carried out at both the upper and underside faces thereof, where the upper face side is the region forming the outer face of the product following fabrication, so there is applied thereto a coating material which is outstanding in terms of coated film external appearance, physical properties (hardness, adhesion, scratch resistance, bendability, etc.), corrosion resistance, and weatherability, etc., and the coating process adopted therefor is a 2-coat 2-bake system employing a primer and topcoat coating material, or a 3-coat 3-bake system employing a primer, intermediate-coat coating material, and a topcoat coating material. On the other hand, since the underside face is positioned on the inside of the product following fabrication, the same level of coated film external appearance and weatherability is not demanded as in the case of the upper face side, so, from the point of view of cost, the coating thereof is generally carried out by a 1-coat 1-bake system employing just a backcoat coating material, but in applications where corrosion resistance is especially demanded a 2-coat 2-bake system employing a primer and a backcoat coating material is adopted.

While, the upper and underside faces of the precoated steel ideally have the same appearance (gloss, color tone), since the underside of the precoated steel forms the inside of the processed product following fabrication it is hardly ever seen, so a high level of design is not demanded and usually just, for example, two types of coating material are provided as the backcoat coating material, namely a high-gloss backcoat coating material and a low-gloss backcoat coating material, such that in the case where the upper side gloss is comparatively high the high-gloss backcoat coating material is applied to the underside, whereas in the case where the upper side gloss is comparatively low the low-gloss backcoat coating material is applied to the underside, and, in this way, the number of coating material products employed is reduced and costs improved.

Of these, the low-gloss backcoat coating material has hitherto been produced by incorporating an inorganic powder such as silica which has a gloss-lowering effect, but problems have arisen such as a lowering in coatability caused by a rise in viscosity, or a reduction in bendability, and also gloss transfer due to poor pressure mark resistance, etc. Here, gloss transfer due to poor pressure mark resistance refers to the phenomenon whereby, in the case where precoated steel sheet with a different gloss at the upper side from that at the underside has a coil shape, and strong pressure is applied while the upper side and underside are in contact, the gloss of the high-gloss face is lowered while, conversely, the gloss of the low-gloss face is raised, and this is perceived as an apparent transfer of gloss from the high-gloss side to the low-gloss side. This phenomenon is thought to occur because the low-gloss face, which has minute projections and indentations, is pressed against the comparatively smooth high-gloss face, so that these minute projections and indentations on the low-gloss face eat into the surface of the high-gloss face and lower the smoothness thereof, while, at the same time, the fine projections and indentations on the low-gloss face are squashed against the smooth high-gloss face and thereby smoothened. When this phenomenon occurs, the precoated steel sheet surface gloss changes while stored in the coiled state, and there is also an especially marked change in gloss in regions where there is a localized load application, with the result that gloss transfer variations arise where the gloss transfer is unevenly manifested, so there is the problem that it is not possible to provide a uniform final product.

In patent document 1 there is disclosed a backcoat coating material composition which contains at least one type of fine resin particles selected from polyamide resins, polyacrylonitrile resins, and acrylic resins.

However, there are problems therewith in that, depending on the type of fine resin particles employed, it fails the pressure mark resistance test and shedding of the fine particles themselves takes place.

In patent document 2, there is described a means for enhancing the scratch resistance of steel sheet by using soft urethane beads, but when the precoated steel sheet is subjected to high pressure the beads themselves are distorted and it is not possible to sustain the expected performance.

In patent document 3, reactive type urethane beads are described. The characteristic feature of these beads is that they have a reactive blocked isocyanate at the surface but, in practice, good results are not shown when a pressure mark resistance test is carried out. The reason for this is thought to be that, while shedding of the beads due to rubbing, etc., is indeed suppressed by chemical bonding of the reactive urethane beads to the matrix resin, when the beads are subjected to a deforming pressure they do not then return to their original state.

PRIOR-ART LITERATURE

Patent Literature

[Patent Document 1] JP-A-2006-219731
[Patent Document 2] Japanese Patent 4448511
[Patent Document 3] JP-A-2009-197067

OUTLINE OF THE INVENTION

Problem to be Solved by the Invention

The objectives of the present invention are both to provide a coating material composition for forming on the underside of precoated steel sheet a coated film which, in particular, is outstanding in its pressure mark resistance, coated film adhesion, and bendability, and also to provide coated films obtained by the application of this coating material composition.

Means for Solving the Problem

As a result of painstaking research to solve the aforesaid problem, the present inventors have discovered that in the case where the compression strength of the resin beads at the time of the 10% pressurized deformation is restricted to a specified range and, furthermore, in the case where the recovery following the 90% pressurized deformation is restricted to a specified range, there is obtained a coating material composition which can form a backcoat film showing good evaluation results in terms of pressure mark resistance, coated film adhesion, and bendability, and the present invention has been perfected based on this discovery.

Moreover, they have found that, by restricting the contained amount of the resin beads to a specified range, based on mass, and by restricting the average particle diameter to a specified range, even better evaluation results are obtained in terms of pressure mark resistance, coated film adhesion, and bendability.

Specifically, the present invention relates to a coating material composition which contains coated film forming resin (A), crosslinking agent (B), and resin beads (C), where the compression strength of said resin beads (C) at the time of the 10% pressurized deformation of an individual resin bead by means of a micro-compression tester lies between 0.1 MPa and 20 MPa and, furthermore, the recovery of the resin beads (C) following the 90% pressurized deformation of an individual resin bead by means of a micro-compression tester is at least 80%.

Furthermore, the present invention provides a coating material composition where, in the coating material composition described above, the content by mass of the aforesaid resin beads (C) lies between 0.5 and 20 mass % in terms of the total solids content by mass of aforesaid coated film forming resin (A) and aforesaid crosslinking agent (B).

Moreover, the present invention provides a coating material composition where the compression strength at the time of the aforesaid 10% pressurized deformation lies between 0.2 MPa and 1.5 MPa and, furthermore, the content by mass of the aforesaid resin beads (C) lies between 0.8 and 15 mass % in terms of the total solids content by mass of aforesaid coated film forming resin (A) and aforesaid crosslinking agent (B).

Again, the present invention provides a coating material composition where, in the composition described above, the aforesaid resin beads (C) are produced by a urethane reaction.

The present invention also provides a coating material composition where the aforesaid resin beads (C) are produced by a urethane reaction, and the starting material isocyanate is difunctional.

Additionally, there are provided coated films which are outstanding in terms of their pressure mark resistance, coated film adhesion, and bendability, by application of an inventive coating material composition.

Effects of the Invention

By application of the coating material composition of the present invention to the underside, it is possible to obtain a coated film which is outstanding in terms of pressure mark resistance, coated film adhesion, and bendability.

Mode of Practicing the Invention

The coated film forming resin (A) employed in the coating material composition of the present invention is not particularly restricted providing it is a resin which has a coated film forming capacity and, furthermore, has functional groups which can react with crosslinking agent (B), but, in terms of bendabilyty and close adhesion, it is preferably at least one coated film forming resin selected from epoxy resins and polyester resins. Such coated film forming resins can be employed on their own, or it is possible to use combinations of two or more types.

In the case where an epoxy resin is employed as coated film forming resin (A), examples of the epoxy resin are bisphenol A type epoxy resins synthesized from bisphenol A and epichlorohydrin, and bisphenol F type epoxy resins synthesized from bisphenol F and epichlorohydrin, but the bisphenol A type epoxy resins are preferred in terms of corrosion resistance.

When an epoxy resin is used as coated film forming resin (A), from the point of view of bendabilyty, corrosion resistance, and coating efficiency, etc., the number average molecular weight of the epoxy resin is preferably between 400 and 10,000, and preferably between 2,000 and 8,000. The value of the number average molecular weight in this invention is that determined by means of gel permeation chromatography (GPC) using polystyrenes as standard materials.

If an epoxy resin is employed as the coated film forming resin (A), all or some of the epoxy groups or hydroxyl groups in this epoxy resin may be modified by reaction with a modifier. Examples of epoxy resin modifiers are polyesters, alkanolamines, caprolactone, isocyanate compounds, phosphoric acid compounds, acid anhydrides, and the like. These modifiers may be employed on their own, or a combination of two or more types thereof can be used.

In the case where a polyester resin is employed as coated film forming resin (A), this polyester resin can be obtained by known methods employing a reaction between polyhydric alcohols and polybasic acids.

Examples of the polyhydric alcohols are glycols, and trihydric or higher polyhydric alcohols. Examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methylpropanediol, cyclohexanedimethanol, 3,3-diethyl-1,5-pentanediol, and the like. Examples of the trihydric or higher polyhydric alcohols include glycerol, trimethylolethane, trimethylolpropane, pentaerythritol, dipentaerythritol, and the like. These polyhydric alcohols can be used on their own, or it is possible to employ combinations of two or more thereof.

Normally, polycarboxylic acids are used as the polybasic acids but, where required, a monobasic fatty acid, or the like, may also be jointly employed. Examples of the polycarboxylic acids include phthalic acid, tetrahydrophthalic acid, hexahydrophthalic acid, 4-methylhexahydrophthalic acid, bicyclo[2,2,1]heptane-2,3-dicarboxylic acid, trimellitic acid, adipic acid, sebacic acid, succinic acid, azelaic acid, fumaric acid, maleic acid, itaconic acid, pyromellitic acid, dimer acid, etc., and the anhydrides thereof, and also 1,4-cyclohexanedicarboxylic acid, isophthalic acid, tetrahydroisophthalic acid, hexahydroisophthalic acid, hexahydroterephthalic acid, and the like. These polybasic acids may be used on their own, or it is possible to employ combinations of two or more thereof.

When a polyester resin is used as coated film forming resin (A), from the point of view of solvent resistance and bendabilyty, etc., it is preferred that the hydroxyl value of the polyester resin lies between 5 and 200 mgKOH/g.

Moreover, when a polyester resin is used as coated film forming resin (A), it is preferred from the point of view of solvent resistance and bendabilyty, etc., that the number average molecular weight of said polyester resin be from 500 to 20,000.

The crosslinking agent (B) employed in the present invention reacts with coated film forming resin (A) to form a cured coated film. Examples of crosslinking agent (B) include amino resins, polyisocyanate compounds, and blocked polyisocyanate compounds, etc., but, from the point of view of bendabilyty and general applicability, melamine resins and blocked polyisocyanate compounds are preferred. These crosslinking agents can be used on their own, or they can be employed in combinations of two or more thereof.

'Amino resins' refers to the resins obtained by the addition to and condensation of formaldehyde with compounds which possess an amino group, specific examples of which are melamine resins, urea resins, and guanamine resins, etc. Of these, the melamine resins are preferred. Examples of the melamine resins include the partially- or wholly-methylolated melamine resins obtained by the reaction between melamine and formaldehyde, partial- or wholly-alkyl ether type melamine resins obtained by the partial or total etherification of the methylol groups in methylolated melamine resins using an alcohol component, imino group-containing melamine resins, and melamine resins comprising mixtures of these. Examples of the alkyl ether type melamine resins include methylated melamine resins, butylated melamine resins, and methyl/butyl mixed-alkyl type melamine resins, etc.

Examples of the polyisocyanate compounds include hexamethylene diisocyanate, trimethylhexamethylene diisocyanate, dimer acid diisocyanate, and other such aliphatic diisocyanates, isophorone diisocyanate, xylylene diisocyanate (XDI), m-xylylene diisocyanate, hydrogenated XDI, hydrogenated TDI, hydrogenated MDI, and other such alicyclic diisocyanates, tolylene diisocyanate (TDI), 4,4-diphenylmethane diisocyanate (MDI), and other such aromatic diisocyanates, together with the adducts, biurets, isocyanurates, etc., thereof. These polyisocyanate compounds can be used on their own, or combinations of two or more thereof can be employed.

Examples of the blocked polyisocyanate compounds are compounds where the isocyanate groups in a poly-isocyanate compound are blocked with, for example, alcohols such as butanol, oximes such as methyl ethyl ketoxime, lactams such as ε-caprolactam, diketones such as acetoacetic acid diesters, imidazoles such as imidazole per se or 2-ethylimidazole, and phenols such as m-cresol, etc.

From the point of view of corrosion resistance and bendabilyty, it is preferred that the solids component content, by mass, of crosslinking agent (B) in terms of the coated film forming resin (A) in the coating material composition of the present invention be from 3 to 60 mass %. If it is less than 3 mass % the coated film strength may be lowered, whereas if it is more than 60 mass % the bendabilyty may be lowered.

In the coating material composition of the present invention, along with the aforesaid components there may also be optionally included the various known components normally used in the coating materials field. Specific examples of these are leveling agents, defoaming agents and other types of surface conditioners, dispersing agents, sedimentation preventives, UV absorbers, light stabilizers, and various other types of additives, coloring pigments, extender pigments, and various other types of pigments, glitter materials, curing catalysts, organic solvents, and the like.

The resin beads (C) employed in the present invention have a compression strength at the time of the 10% pressurized deformation of an individual resin bead by means of a micro-compression tester of between 0.1 MPa and 20 MPa, preferably between 0.15 MPa and 10 MPa, and more preferably between 0.2 MPa and 1.5 MPa. Furthermore, the recovery of the resin beads (C) following 90% pressurized deformation of an individual resin bead by means of the micro-compression tester is at least 80%, and preferably at least 90%, and this contributes to the anti-blocking property of the cured coated film.

The compression strength of the resin beads (C) at the time of the 10% pressurized deformation of an individual resin bead in the present invention and the recovery thereof following 90% pressurized deformation are the values measured by means of a micro-compression tester ("MCT-510", produced by the Shimadzu Corporation). Specifically, a single bead is set on the lower pressure plate of the tester and, while lowering the upper pressure plate, the single bead is subjected to compressive deformation during which time measurement of the load is performed, and the load at the point when the resin bead diameter is reduced 10% is taken as the compression strength at the time of 10% pressurized deformation. Furthermore, a single bead is subjected to compressive deformation and the loading halted at the point when the bead diameter has been reduced 90%. Taking the resin bead diameter prior to the application of the load as $d_i$ (mm), and the diameter of the resin bead after the elapse of 60 seconds following the termination of loading as $d_t$ (mm), it is possible to calculate the recovery from 90% pressurized deformation by means of the following equation (1).

$$\text{Recovery from 90\% pressurized deformation} = d_t/d_i \qquad \text{Eq. (1)}$$

Even in the case where the aforesaid compression strength of the resin beads (C) is between 0.1 and 20 MPa, if the recovery of the individual resin bead from 90% pressurized deformation by means of the micro-compression tester is less than 80%, then the pressure mark resistance of the coated film is insufficient.

The content, by mass, of the resin beads (C) in terms of the total solids content by mass of aforesaid coated film forming resin (A) and aforesaid crosslinking agent (B) is preferably from 0.5 to 20 mass %, more preferably from 0.8 to 15 mass %, and still more preferably from 1.0 to 15 mass %. If it is less than 0.5 mass %, the pressure mark resistance may be lowered. On the other hand, there may be a reduction in bendabilyty if it is more than 20 mass %.

The average particle diameter of the resin beads (C) is preferably 5-30 μm. If the average particle diameter is less than 5 μm, the enhancement in the pressure mark resistance of the coated film is insufficient, whereas if it exceeds 30 μm then, as well as the external appearance being unsatisfactory, there is also a lowering in the pressure mark resistance due to shedding of the resin beads.

Next, the resin beads production process is described.

<First Stage: Preparation of the Urethane Starting Material>

In the first stage, the starting materials isocyanate and polyol are mixed together. Di-functional or tri-functional isocyanate and the polyol are mixed together beforehand, in preparation for the subsequent suspension polymerization. When difunctional isocyanate and polyol are used, it is possible to obtain resin beads which are highly elastic. When trifunctional isocyanate and polyol are used, rigid resin beads are formed. Thus, these may be suitably employed together to adjust the properties. In terms of isocyanate type, there may be used a type which undergoes yellowing or a non-yellowing type.

As a general rule, the polyol employed is mixed with the isocyanate in equimolar proportions. The proportions of isocyanate and polyol are altered according to the molecular weight of the polyol used. If there is too little polyol component, hard particles are obtained, whereas if there is too much polyol component soft particles tend to be obtained.

The polyol component may be a polyester-, polyether- or acrylic-polyol, etc. Moreover, these can also be jointly employed.

Where the viscosity of the suspension liquid is high and handling becomes difficult, it is preferred that a diluent solvent be mixed with the beads starting materials. Examples of diluent solvents are those which dissolve the polyisocyanate prepolymer containing blocked isocyanate groups, and which do not inhibit the polymerization reaction.

The aforesaid beads starting material is added to water containing a suspension stabilizer. This water containing a suspension stabilizer is prepared by dissolving or dispersing a suspension stabilizer in water.

The suspension stabilizer is not particularly restricted providing it is of a kind generally employed in suspension polymerizations, and it may be of an organic or inorganic type. Specific examples of suspension stabilizers include methyl cellulose, hydroxyethyl cellulose, hydroxypropyl methyl cellulose, carboxymethyl cellulose, and other types of cellulose-based water-soluble resins, polyvinyl alcohol, polyacrylates, polyethylene glycol, polyvinyl pyrrolidone, polyacrylamides, tertiary phosphates, and the like. One of these may be used on its own, or two or more may be employed together.

Furthermore, a surfactant may be jointly employed along with the suspension stabilizer. The surfactant jointly employed along with the suspension stabilizer may be an anionic surfactant, cationic surfactant, nonionic surfactant, or amphoteric surfactant.

The amount of suspension stabilizer added per 100 parts by mass of the isocyanate prepolymer containing blocked isocyanate groups will differ according to the type employed, but from 1 to 10 parts by mass is preferred. When the added amount of suspension stabilizer lies within this range, the average particle diameter of the beads tends to fall within the range 5-30 µm which is suitable as a filler.

If the amount of suspension stabilizer is greater than 10 parts by mass, the average particle diameter tends to be less than 5 µm and, furthermore, the viscosity of the suspension liquid tends to rise, so that the solid/liquid separation and washing steps become more difficult. On the other hand, with less than 1 part by mass of the suspension stabilizer, the particles tend to aggregate and, moreover, there is a tendency for the particle diameter to rise above 30 µm.

The amount of water in which the dispersion stabilizer has been dissolved or dispersed preferably lies in the range from 100 to 300 parts by mass per 100 parts by mass of the polyisocyanate prepolymer containing blocked isocyanate groups.

<Second Stage: Suspension Polymerization>

After adding the beads starting material to the water containing the suspension stabilizer, normally a stirring method is adopted to bring about dispersion thereof in particle form. The stirring rate at this time is preferably suitably adjusted so that the urethane starting material prepared in the first stage adopts a specified particle diameter.

Having completed the adjustment of the particle diameter of the dispersed particles of polyisocyanate prepolymer containing blocked isocyanate groups, the temperature is raised to 30-90° C., and suspension polymerization carried out for between 1 and 6 hours so that a suspension liquid is obtained.

<Third Stage: After-Treatment>

A means such as filtering or centrifuging is used for the solid/liquid separation in the after-treatment step.

In the washing step, the separated and recovered reactive polyurethane beads are further washed with water or the like, so that any suspension stabilizer remaining on the polyurethane beads is removed. For the drying, there is employed a hot drying method, an airborne drying method, a vacuum drying method, an infrared drying method, or the like. For example, in the case where a hot drying method is employed, it is preferred that the drying temperature be set to between 40 and 110° C. and that the drying time be from 2 to 40 hours.

When subjecting the suspension liquid to solid/liquid separation and washing, the suspension liquid may also be treated with, for example, an enzyme such as a cellulose degrading enzyme or a polyvinyl alcohol degrading enzyme, or a reagent such as a hypochlorite, to decompose the suspension stabilizer. By treatment in this way, it is possible to reduce the viscosity of the suspension liquid and thereby facilitate solid/liquid separation, in addition to which the washing is also facilitated.

As examples of the materials which are coated using the coating material composition of the present invention, there are hot-dip galvanized steel sheet, electro-galvanized steel sheet, alloyed galvanized steel sheet, aluminum-zinc coated steel sheet, nickel-zinc coated steel sheet, magnesium-aluminum-zinc coated steel sheet, magnesium-aluminum-silica-zinc coated steel sheet, and various other types of galvanized steel sheet, stainless steel sheet, and aluminum sheet, etc., which have undergone treatment with chrome-free or chromate-based chemical treatment agents, etc.

In the production of the precoated steel sheet, generally speaking a topcoat coating material is applied onto a coated film of primer. By applying a topcoat coating material, it is possible to confer attractiveness on the precoated steel sheet, and it is also possible to enhance various properties demanded of the precoated steel sheet such as bendabilyty, weatherability, chemical resistance, contamination resistance, water resistance, and corrosion resistance, etc.

The uses of the coating material composition of the present invention are not particularly restricted, but it is preferably employed as the backcoat coating material in the production of precoated steel sheet.

With regard to the coating method used for the coating material composition of the present invention, it is possible to employ any of the methods normally used in the production of precoated steel sheet, for example roll coater coating, curtain flow coater coating, and the like.

The usual coating conditions in the production of precoated steel sheet can be employed as the coating conditions in the case of the coating material composition of the present invention. The coated film thickness of primer coating material in the production of the precoated steel sheet is, for example, 1 to 30 µm, and the hot curing conditions for the primer coated film are, for example, a maximum attained sheet temperature of 150-300° C. and a curing time of 15 to 150 seconds. The coated film thickness of the topcoat coating material in the production of the precoated steel sheet is, for example, 10 to 25 µm, and the hot curing conditions for the topcoat coated film are, for example, a maximum attained sheet temperature of 190-250° C. and a hardening time of 20 to 180 seconds.

WORKING EXAMPLES

Below, the present invention is explained in further detail by providing working examples, but the invention is not to be restricted thereto. Unless otherwise stated, references to parts, percentage (%), and ratio in the examples respectively denote parts by mass, mass %, and mass ratio.

Resin Beads Synthesis Examples C-1 to C-14, and Comparative Synthesis Examples RC-1 to RC-3

The starting materials shown in Table 1 (for the first flask) were introduced in the amounts shown in Table 1 into a 2 L flask equipped with a stirrer, and reaction then carried out for 4 hours at 80° C. while stirring, to produce the urethane prepolymer. Next, the materials shown in Table 1 (for the second flask) were introduced in the amounts shown in Table 1 into a separate 2 L flask equipped with a stirrer and then, while stirring, the urethane prepolymer prepared in the first flask was dispersed therein and reaction carried out for 2 hours at 60° C. The resin beads obtained by means of the reaction were filtered off using a metal mesh and washed with pure water, after which drying was carried out for 3 hours in a hot-air dryer at 80° C. and, in this way, resin beads C-1 to C-14, and RC-1 to RC-3, were obtained respectively.

TABLE 1

| | Starting Materials | Equivalent Weight | Synthesis Example | | | | | | | |
|---|---|---|---|---|---|---|---|---|---|---|
| | | | C-1 | C-2 | C-3 | C-4 | C-5 | C-6 | C-7 | C-8 |
| First Flask | hexamethylene diisocyanate trimer | 183 | | | | | | | | 91 |
| | hexamethylene diisocyanate dimer | 193 | 193 | 193 | 193 | 193 | 193 | 193 | 193 | 96 |
| | diphenylmethane diisocyanate polymer | 138 | | | | | | | | |
| | tolylene diisocyanate monomer | 87 | | | | | | | | |
| | polycaprolactone polyol | 100 | 100 | | 75 | 50 | 25 | 50 | 50 | 50 |
| | diethylene glycol | 53 | | 53 | 13 | 26 | 40 | 26 | 26 | 26 |
| | dibutyltin dilaurate | | 0.1 | 0.1 | 0.1 | 0.1 | 0.1 | 0.1 | 0.1 | 0.1 |
| | toluene | | 50 | 50 | 50 | 50 | 50 | 50 | 50 | 50 |
| Second Flask | pure water | | 300 | 300 | 300 | 300 | 300 | 300 | 300 | 300 |
| | polyvinyl alcohol | | 3 | 3 | 3 | 3 | 3 | 20 | 30 | 3 |
| Evaluation Results | average particle diameter (µm) | | 21 | 24 | 25 | 28 | 23 | 9 | 6 | 23 |
| | compression strength at 10% deformation (MPa) | | 0.1 | 0.9 | 0.3 | 0.5 | 0.8 | 0.5 | 1 | 15 |
| | recovery following 90% pressurized deformation (%) | | 98 | 95 | 96 | 96 | 98 | 94 | 90 | 82 |

| | Starting Materials | Synthesis Example | | | | | | Comparative Synthesis Example | | |
|---|---|---|---|---|---|---|---|---|---|---|
| | | C-9 | C-10 | C-11 | C-12 | C-13 | C-14 | RC-1 | RC-2 | RC-3 |
| First Flask | hexamethylene diisocyanate trimer | 91 | 91 | | | | 183 | 183 | 183 | 183 |
| | hexamethylene diisocyanate dimer | 96 | 96 | | | 193 | | | | |
| | diphenylmethane diisocyanate polymer | | | 138 | | | | | | |
| | tolylene diisocyanate monomer | | | | 87 | | | | | |

TABLE 1-continued

| | | 1 | 2 | 3 | 4 | 5 | 6 | 7 | 8 | 9 |
|---|---|---|---|---|---|---|---|---|---|---|
| | polycaprolactone polyol | | 100 | | 100 | 50 | 50 | 100 | | 0 |
| | diethylene glycol | 53 | | 53 | 0 | 26 | 26 | | 53 | 53 |
| | dibutyltin dilaurate | 0.1 | 0.1 | 0.1 | 0.1 | 0.1 | 0.1 | 0.1 | 0.1 | 0.1 |
| | toluene | 50 | 50 | 50 | 0 | 50 | 50 | 50 | 50 | 0 |
| Second Flask | pure water | 300 | 300 | 300 | 300 | 300 | 300 | 300 | 300 | 300 |
| | polyvinyl alcohol | 3 | 3 | 3 | 3 | 40 | 2 | 3 | 3 | 3 |
| Evaluation Results | average particle diameter (μm) | 26 | 20 | 29 | 15 | 4 | 34 | 20 | 25 | 15 |
| | compression strength at 10% deformation (MPa) | 19 | 16 | 20 | 9 | 2 | 8 | 22 | 28 | 15 |
| | recovery following 90% pressurized deformation (%) | 85 | 80 | 80 | 87 | 95 | 80 | 90 | 80 | 78 |

The details of the starting materials used in Table 1 were as follows.

Hexamethylene diisocyanate trimer: Sumidur N3200 (produced by the Sumika Bayer Urethane Co.)

Hexamethylene diisocyanate dimer: Sumidur N3400 (produced by the Sumika Bayer Urethane Co.)

Diphenylmethane diisocyanate polymer: Millionate MR200 (produced by the Nippon Polyurethane Industry Co.)

Tolylene diisocyanate monomer: Cosmonate T100 (produced by the Mitsui Chemicals Co.)

Polycaprolactone polyol: Placcel 303 (produced by the Daicel Corporation)

Polyvinyl alcohol: Poval 220 (produced by the Kuraray Co.)

<Method of Measuring the Average Particle Diameter>

The average particle diameter of the synthesized resin beads was measured using a laser diffraction type particle size distribution measurement device ("SALD-2300", produced by the Shimadzu Corporation). The results are shown in Table 1.

<Measurement of the Compression Strength and Percentage Recovery of the Resin Beads>

The compression strength at the time of 10% pressurized deformation and the percentage recovery following 90% pressurized deformation of the synthesized resin beads were determined by measurements made using a micro-compression tester ("MCT-510", produced by the Shimadzu Corporation). The results are shown together in Table 1.

Production Example 1 (Production of Backcoat Coating Material bBase E-1)

Using a flask equipped with a stirrer, condenser, and thermometer, 80 parts of epoxy resin (commercial name "jER 1009"; a bisphenol A type epoxy resin, produced by the Mitsubishi Chemical Co.), was heated and dissolved in 120 parts of a mixed solvent (aromatic solvent (commercial name "Solvesso 100", produced by the Exxon Mobil Chemical Co.)/cyclohexanone/n-butanol=55/27/18 (mass ratio)), to obtain an epoxy resin solution to provide coated film forming resin (A). Next, 30 parts of cyclohexanone, and 30 parts of aromatic solvent (commercial name "Solvesso 150", produced by the Exxon Mobil Chemical Co.) were added to 200 parts of this epoxy resin solution, and then 70 parts of titanium dioxide (commercial name "JR701", produced by the Tayca Corporation), 1 part of carbon black pigment, 20 parts of anti-corrosive pigment (commercial name "Shieldex C303", produced by W.R. Grace & Co.), and 8 parts of precipitated barium sulfate were introduced, after which dispersion was carried out to a particle size of 5-10 μm using a sand grinding mill, and a mill base obtained. As crosslinking agent (B), 21 parts of a blocked polyisocyanate compound (commercial name "Desmodur BL-3175", (solids content 75%), produced by the Sumika Bayer Urethane Co.) and 1.2 parts of dibutyltin dilaurate (DBTDL) were added to this mill base and uniform mixing performed, to obtain backcoat coating material base E-1 (solids content 51%).

Production Example 2 (Production of Backcoat Coating Material Base E-2)

160 parts of the Evonik Degussa Co. product Dynapol LH822 (solids content 55%, number average molecular weight 5000, hydroxyl value 50 mg/g), 30 parts of cyclohexanone, and 30 parts of an aromatic solvent (commercial name "Solvesso 150", produced by the Exxon Mobil Chemical Co.) were added, and then 70 parts of titanium dioxide (commercial name "JR701", manufactured by the Tayca Corporation), 1 part of carbon black pigment, 20 parts of anti-corrosive pigment (commercial name "Shieldex C303", produced by W.R. Grace & Co.) and parts of precipitated barium sulfate introduced, after which dispersion was carried out to a particle size of 5-10 μm using a sand grinding mill, and a mill base obtained. 40 parts of n-butylated melamine resin (produced by the Mitsui Chemicals Co.; U-Van 122 (solids content 60%)) were added as crosslinking agent (B) to this mill base and uniform mixing performed, to obtain backcoat coating material base E-2 (solids content 60%).

Production Example 3 (Production of Primer Coating Material P-1)

Using a flask equipped with a stirrer, condenser, and thermometer, 80 parts of epoxy resin (commercial name "jER1009"; a bisphenol A type epoxy resin, produced by the Mitsubishi Chemical Co.), was heated and dissolved in 120 parts of a mixed solvent (aromatic solvent (commercial name "Solvesso 100", produced by the Exxon Mobil Chemical Co.)/cyclohexanone/n-butanol=55/27/18 (mass ratio)), to obtain an epoxy resin solution to provide coated film forming resin (A). Next, 30 parts of cyclohexanone, and 30 parts of aromatic solvent (commercial name "Solvesso 150", produced by the Exxon Mobil Chemical Co.) were added to 200 parts of this epoxy resin solution, and then 30 parts of anti-corrosive pigment (commercial name "Shieldex C303", produced by W.R. Grace & Co.) introduced, after which dispersion was carried out to a particle size of 20-25 μm using a sand grinding mill, and a mill base obtained. As the crosslinking agent (B), 21 parts of a blocked polyisocyanate compound (commercial name "Desmodur BL-3175", produced by the Sumika Bayer Urethane Co.) and 1.2 parts of dibutyltin dilaurate (DBTDL) were added to this mill base and uniform mixing performed, to obtain primer coating material P-1.

Working Examples CB-1 to CB-18, Comparative Examples RCB-1 to RCB-3 (Production of the Backcoat Coating Materials)

The resin beads (C) shown in Tables 2 and 3 were added in the amounts shown in Tables 2 and 3 to 400 parts of the backcoat coating material base E-1 obtained in Production Example 1, then fine silica powder (commercial name "Nipsil E-200A", produced by the Tosoh Silica Corporation) added and adjustment performed such that the 60° mirror surface gloss was 10, and, in this way, backcoat coating materials CB-1 to CB-18 and RCB-1 to RCB-3 were obtained. The combined total of coated film forming resin (A) and crosslinking agent (B) contained per 400 parts by mass of the backcoat coating material base E-1 was 100 parts by mass.

TABLE 2

|  |  | Working Example | | | | | | | | | |
|---|---|---|---|---|---|---|---|---|---|---|---|
|  |  | CB-1 | CB-2 | CB-3 | CB-4 | CB-5 | CB-6 | CB-7 | CB-8 | CB-9 | CB-10 |
| backcoat coating material base E-1 | | 400 | 400 | 400 | 400 | 400 | 400 | 400 | 400 | 400 | 400 |
| resin beads (C) | C-1 | 2 | | | | | | | | | |
| | C-2 | | 2 | | | | | | | | |
| | C-3 | | | 1 | | | | | | | |
| | C-4 | | | | 4 | | | | | | |
| | C-5 | | | | | 6 | | | | | |
| | C-6 | | | | | | 1 | | | | |
| | C-7 | | | | | | | 2 | | | |
| | C-8 | | | | | | | | 2 | | |
| | C-9 | | | | | | | | | 2 | |
| | C-10 | | | | | | | | | | 2 |
| fine silica powder | | 3.2 | 3.2 | 4 | 1.6 | 1.2 | 4 | 3.2 | 3.2 | 3.2 | 3.2 |
| resin beads (C)/ [resin (A) + crosslinking agent (B)] (%) | | 2 | 2 | 1 | 4 | 6 | 1 | 2 | 2 | 2 | 2 |
| evaluation results | pressure mark resistance | ○ | ◎ | ◎ | ◎ | ◎ | ◎ | ◎ | ○ | ○ | ○ |
| | coated film adhesion | ◎ | ◎ | ◎ | ◎ | ◎ | ◎ | ◎ | ◎ | ◎ | ◎ |
| | bendability | ◎ | ◎ | ◎ | ◎ | ◎ | ◎ | ◎ | ◎ | ◎ | ◎ |

TABLE 3

|  |  | Working Example | | | | | | | | Comparative Example | | |
|---|---|---|---|---|---|---|---|---|---|---|---|---|
|  |  | CB-11 | CB-12 | CB-13 | CB-14 | CB-15 | CB-16 | CB-17 | CB-18 | RCB-1 | RCB-2 | RCB-3 |
| backcoat coating material base E-1 | | 400 | 400 | 400 | 400 | 400 | 400 | 400 | 400 | 400 | 400 | 400 |
| resin beads (C) | C-2 | | | 0.6 | 17 | 0.4 | 22 | | | | | |
| | C-11 | 2 | | | | | | | | | | |
| | C-12 | | 2 | | | | | | | | | |
| | C-13 | | | | | | | 2 | | | | |
| | C-14 | | | | | | | | 2 | | | |
| | RC-1 | | | | | | | | | 2 | | |
| | RC-2 | | | | | | | | | | 2 | |
| | RC-3 | | | | | | | | | | | 2 |
| fine silica powder | | 3.2 | 3.2 | 4.8 | 0 | 5.8 | 0 | 3.2 | 3.2 | 3.2 | 3.2 | 3.2 |
| resin beads (C)/ [resin (A) + crosslinking agent (B)] (%) | | 2 | 2 | 0.6 | 17 | 0.4 | 22 | 2 | 2 | 2 | 2 | 2 |
| evaluation results | pressure mark resistance | ○ | ○ | ○ | ◎ | △ | ◎ | △ | △ | X | X | X |
| | coated film adhesion | ◎ | ◎ | ◎ | ◎ | ◎ | ○ | ◎ | ◎ | ◎ | ◎ | ◎ |
| | bendability | ◎ | ◎ | ◎ | ○ | ◎ | △ | ◎ | ◎ | ◎ | ◎ | ◎ |

Working Examples CB-31 to CB-48, Comparative Examples RCB-31 to RCB-33 (Production of the Backcoat Coating Materials)

The resin beads (C) shown in Tables 4 and 5 were added in the amounts shown in Tables 4 and 5 to 327 parts of the backcoat coating material base E-2 obtained in Production Example 2, then fine silica powder (commercial name "Nipsil E-200A", produced by the Tosoh Silica Corporation) added and adjustment performed such that the 60° mirror surface gloss was 10, and, in this way, backcoat coating materials CB-31 to CB-48, and RCB-31 to RCB-33, were obtained. The combined total of coated film forming resin (A) and crosslinking agent (B) contained per 327 parts by mass of backcoat coating material base E-2 was 100 parts by mass.

Preparation of the Test Pieces

Preparation of Sheets Coated with the Backcoat Coating Material

Using a bar coater, backcoat coating materials CB-1 to CB-48, and RCB1 to RCB33, were respectively applied to one face of chemically-treated aluminum/zinc alloy coated steel sheets (Al 55%) of sheet thickness 0.35 mm, to give a dry film thickness of 8 μm, and then these sheets were each baked in a hot air dryer for 40 seconds at a maximum attained sheet temperature of 220° C., to form the backcoat coated film.

TABLE 4

| | | Working Example | | | | | | | | | |
|---|---|---|---|---|---|---|---|---|---|---|---|
| | | CB-31 | CB-32 | CB-33 | CB-34 | CB-35 | CB-36 | CB-37 | CB-38 | CB-39 | CB-40 |
| backcoat coating material base E-2 | | 327 | 327 | 327 | 327 | 327 | 327 | 327 | 327 | 327 | 327 |
| resin | C-1 | 2 | | | | | | | | | |
| beads | C-2 | | 2 | | | | | | | | |
| (C) | C-3 | | | 1 | | | | | | | |
| | C-4 | | | | 4 | | | | | | |
| | C-5 | | | | | 6 | | | | | |
| | C-6 | | | | | | 1 | | | | |
| | C-7 | | | | | | | 2 | | | |
| | C-8 | | | | | | | | 2 | | |
| | C-9 | | | | | | | | | 2 | |
| | C-10 | | | | | | | | | | 2 |
| fine silica powder | | 3 | 3 | 4 | 1.5 | 1 | 4 | 3 | 3 | 3 | 3 |
| resin beads (C)/ [resin (A) + cross-linking agent (B)] (%) | | 2 | 2 | 1 | 4 | 6 | 1 | 2 | 2 | 2 | 2 |
| evaluation results | pressure mark resistance | ○ | ◎ | ◎ | ◎ | ◎ | ◎ | ◎ | ○ | ○ | ○ |
| | coated film adhesion | ◎ | ◎ | ◎ | ◎ | ◎ | ◎ | ◎ | ◎ | ◎ | ◎ |
| | bendability | ◎ | ◎ | ◎ | ◎ | ◎ | ◎ | ◎ | ◎ | ◎ | ◎ |

TABLE 5

| | | Working Example | | | | | | | | Comparative Example | | |
|---|---|---|---|---|---|---|---|---|---|---|---|---|
| | | CB-41 | CB-42 | CB-43 | CB-44 | CB-45 | CB-46 | CB-47 | CB-48 | RCB-31 | RCB-32 | RCB-33 |
| backcoat coating material base E-2 | | 327 | 327 | 327 | 327 | 327 | 327 | 327 | 327 | 327 | 327 | 327 |
| resin | C-2 | | | 0.6 | 17 | 0.4 | 22 | | | | | |
| beads | C-11 | 2 | | | | | | | | | | |
| (C) | C-12 | | 2 | | | | | | | | | |
| | C-13 | | | | | | | 2 | | | | |
| | C-14 | | | | | | | | 2 | | | |
| | RC-1 | | | | | | | | | 2 | | |
| | RC-2 | | | | | | | | | | 2 | |
| | RC-3 | | | | | | | | | | | 2 |
| fine silica powder | | 3 | 3 | 5 | 0 | 6 | 0 | 3 | 3 | 3 | 3 | 3 |
| resin beads (C)/ [resin (A) + cross-linking agent (B)] (%) | | 2 | 2 | 0.6 | 17 | 0.4 | 22 | 2 | 2 | 2 | 2 | 2 |
| evaluation results | pressure mark resistance | ○ | ○ | ○ | ◎ | △ | ◎ | △ | △ | X | X | X |
| | coated film adhesion | ◎ | ◎ | ◎ | ◎ | ◎ | ○ | ◎ | ◎ | ◎ | ◎ | ◎ |
| | bendability | ◎ | ◎ | ◎ | ○ | ◎ | △ | ◎ | ◎ | ◎ | ◎ | ◎ |

Preparation of Sheets Coated with the Upper Side (Front Surface) Coating Material Using a bar coater, primer coating material P-1 was coated onto that surface of the chemically-treated aluminum/zinc alloy coated steel sheets (Al 55%) of sheet thickness 0.35 mm which had not been coated with the backcoat, to give a dry film thickness of 5 μm, and then the sheets each baked in a hot air dryer for 40 seconds at a maximum attained sheet temperature of 210° C., to form the primer coated film.

Next, using a bar coater, this primer coated film was coated with a polyester resin based topcoat coating material (commercial name "Precolor HD0030"; produced by BASF Japan, brown color) to give a dry film thickness of 15 μm, and then the respective sheets baked in a hot air dryer for 40 seconds at a maximum attained sheet temperature of 220° C., to form the test pieces.

The following evaluations of the coated film properties were carried out on the underside of the test pieces obtained, and the results are shown in Tables 2 to 5.

<Pressure Mark Resistance>

From the prepared coated steel sheets, test pieces were cut of size 10 cm×10 cm, then the front and back faces superimposed, and these left for 24 hours in a 50° C. atmosphere in a state with a pressure of 5 MPa/cm$^2$ applied. Subsequently, the temperature was returned to room temperature and the pressure released, after which the superimposed test pieces were separated and observation performed of the surface pressure marks.

⓪: surface appearance unchanged before and after testing

○: only a slight change to the surface appearance, to an extent that it is not noticeable at first glance Δ: only a slight change to the surface appearance, sufficient to be noticeable at first glance x: considerable change in appearance <Coated Film Adhesion>

Using a cutter knife, a cross-cut pattern of 100 squares of size 1 mm×1 mm was formed in the coated film of the test pieces. Next, using an Erichsen tester, the paint film in the region when the cross-cut pattern had been formed was stretched out from the bottom side of the test piece with the punch, so that the distance from the punch tip to the test piece pressing face was 6 mm. Finally, cellophane tape was tightly affixed to the stretched-out cross-cut region of the paint film, then the tape end suddenly peeled away at an angle of 45° and the state of the cross-cut pattern observed, after which evaluation was performed as follows.

⓪: no peeling of the coated film noted

○: peeled area of coated film no more than 5%

Δ: peeled area of coated film no more than 20% x: peeled area of coated film more than 20%

<Bendability>

The test piece was bent over by 180° with sheets identical to the test piece interposed between. The designation employed was 0T, 2T, etc., based on the number of sheets identical to the test piece interposed in this way. For example, 0T was the case where the test piece was bent over without a sheet identical to the test piece being interposed, and 2T was the case where the test piece was bent over with two sheets identical to the test piece interposed. In the evaluation of the properties of the inventive coated film, the 2T and 3T tests were carried out and, after bending over in this way, cellophane tape was firmly affixed to the crown region, then the tape end suddenly peeled away at an angle of 45°, and the peeled state of the coated film evaluated as follows.

⓪: no peeling of the coated film noted in either the 2T or 3T cases

○: no peeling of the coated film noted in the 3T test but slight peeling observed in the 2T case Δ: slight peeling noted in the 3T case x: marked peeling noted in the 3T case Discussion By employing resin beads where the compression strength at the time of 10% pressurized deformation lay between 0.1 MPa and 20 MPa, and where the recovery following 90% pressurized deformation was at least 80%, excellent results were obtained in all the working examples in the evaluations of pressure mark resistance, coated film adhesion, and bendability.

Furthermore, in the case of CB-1 to CB-14, and CB-31 to CB-44, by employing resin beads (C) of average particle diameter lying between 5 and 30 μm and where the contained amount of said resin beads (C), by mass, in terms of the total solids content mass of coated-film forming resin (A) and crosslinking agent (B) lay between 0.5 and 20 mass %, still more outstanding results were obtained in the evaluations of pressure mark resistance, coated film adhesion and bendability. Moreover, in the case of CB-2 to CB-7, and CB-32 to CB-37, where the compression strength at the time of 10% pressurized deformation of said resin beads (C) lay between 0.2 MPa and 1.5 MPa, and where the content of said resin beads (C) was 0.8-15 mass %, even better evaluation results were obtained.

The invention claimed is:

1. A coating material composition comprising a coated film forming resin (A), a crosslinking agent (B), and resin beads (C), wherein a compression strength of said resin beads (C) at the time of a 10% pressurized deformation of an individual resin bead using a micro-compression tester lies between 0.1 MPa and 20 MPa and a recovery of the resin beads (C) following a 90% pressurized deformation of an individual resin bead using a micro-compression tester is at least 80%.

2. The coating material composition as claimed in claim 1 wherein a content, by mass, of the resin beads (C) lies between 0.5 and20 mass % in terms of the total solids content by mass of said coated film forming resin (A) and said crosslinking agent (B).

3. The coating material composition as claimed in claim 1 wherein an average particle diameter of the aforesaid resin beads (C) lies between 0.5 and 30 μm.

4. The coating material composition as claimed in claim 1 wherein the compression strength at the time of the 10% pressurized deformation lies between 0.2 MPa and 1.5 MPa and the content by mass of the resin beads (C) is between 0.8 and 15 mass % in terms of the total solids content by mass of said coated film forming resin (A) and said crosslinking agent (B).

5. The coating material composition as claimed in claim 1 wherein the resin beads (C) are produced by a urethane reaction.

6. The coating material composition as claimed in claim 1 wherein the resin beads (C) are produced by a urethane reaction and a starting material isocyanate is difunctional.

7. A coated film obtained by an application of the coating material composition as claimed in claim 1.

* * * * *